(12) United States Patent
Kai et al.

(10) Patent No.: US 10,900,112 B2
(45) Date of Patent: Jan. 26, 2021

(54) HOLLOW SPRING MEMBER AND HOLLOW SPRING MEMBER PRODUCTION METHOD

(71) Applicant: NHK SPRING CO., LTD., Yokohama (JP)

(72) Inventors: Morimichi Kai, Yokohama (JP); Akira Tange, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 148 days.

(21) Appl. No.: 16/145,158

(22) Filed: Sep. 27, 2018

(65) Prior Publication Data

US 2019/0032191 A1  Jan. 31, 2019

Related U.S. Application Data

(63) Continuation of application No. PCT/JP2017/005577, filed on Feb. 15, 2017.

(30) Foreign Application Priority Data

Mar. 30, 2016 (JP) .................................. 2016-068014

(51) Int. Cl.
 *C23C 8/22* (2006.01)
 *C21D 9/02* (2006.01)
 (Continued)

(52) U.S. Cl.
 CPC ............... *C23C 8/22* (2013.01); *B60G 11/14* (2013.01); *B60G 21/055* (2013.01); *C21D 1/06* (2013.01);
 (Continued)

(58) Field of Classification Search
 CPC .... C23C 8/02; C23C 8/04; C23C 8/22; C23C 8/80; C21D 1/06; C21D 9/08
 (Continued)

(56) References Cited

U.S. PATENT DOCUMENTS 4,145,232 A * 3/1979 Solomon ................... C23C 8/22
 148/218
4,386,973 A * 6/1983 Kawka ...................... C23C 8/22
 148/223
(Continued)

FOREIGN PATENT DOCUMENTS

CN 103290419 A 9/2013
CN 103518000 A 1/2014
(Continued)

OTHER PUBLICATIONS

Chinese Office Action (and English language translation thereof) dated Jan. 6, 2020 issued in counterpart Chinese Application No. 201780016709.2.
(Continued)

*Primary Examiner* — Christopher P Schwartz
(74) *Attorney, Agent, or Firm* — Holtz, Holtz & Volek PC

(57) ABSTRACT

A hollow spring member and hollow spring member production method can be provided, which can save the time and energy necessary for carburization, thus requiring no dedicated carburizing furnace or the like for carburization, and further can make the interior space of a steel tube a rust-prevention atmosphere. A hollow stabilizer for a vehicle includes a steel tube sealed at one end and another end thereof and a carburizing gas sealed in the interior space of the steel tube.

7 Claims, 3 Drawing Sheets

(51) Int. Cl.
    *C21D 1/06*     (2006.01)
    *F16F 1/06*     (2006.01)
    *F16F 1/14*     (2006.01)
    *B60G 11/14*     (2006.01)
    *B60G 21/055*     (2006.01)
    *C21D 9/08*     (2006.01)
    *C23C 8/02*     (2006.01)
    *C23C 8/04*     (2006.01)
    *C23C 8/80*     (2006.01)
    *F16F 1/04*     (2006.01)

(52) U.S. Cl.
    CPC .............. *C21D 9/02* (2013.01); *C21D 9/08* (2013.01); *C23C 8/02* (2013.01); *C23C 8/04* (2013.01); *C23C 8/80* (2013.01); *F16F 1/042* (2013.01); *F16F 1/06* (2013.01); *F16F 1/14* (2013.01); *B60G 2202/12* (2013.01); *B60G 2202/135* (2013.01); *B60G 2206/012* (2013.01); *B60G 2206/426* (2013.01); *B60G 2206/427* (2013.01); *B60G 2206/71* (2013.01); *B60G 2206/724* (2013.01); *B60G 2206/8402* (2013.01); *B60G 2206/8403* (2013.01); *F16F 2224/0208* (2013.01); *F16F 2224/04* (2013.01); *F16F 2226/02* (2013.01); *F16F 2234/02* (2013.01); *F16F 2238/024* (2013.01); *F16F 2238/026* (2013.01)

(58) Field of Classification Search
    USPC ........ 148/206, 210, 216, 222, 225; 267/188; 280/5.506, 5.511, 124.106, 124.107
    See application file for complete search history.

(56) References Cited

U.S. PATENT DOCUMENTS

| | | | |
|---|---|---|---|
| 10,584,408 B2* | 3/2020 | Nakao | ..................... C23C 8/20 |
| 2011/0277887 A1 | 11/2011 | Foerster et al. | |
| 2014/0060709 A1 | 3/2014 | Tange et al. | |
| 2017/0021691 A1 | 1/2017 | Tange et al. | |
| 2019/0032190 A1* | 1/2019 | Kai | ..................... B60G 21/055 |

FOREIGN PATENT DOCUMENTS

| | | | | |
|---|---|---|---|---|
| GB | 944572 A | | 12/1963 | |
| JP | 46006326 B1 | | 2/1971 | |
| JP | 55011169 A | | 1/1980 | |
| JP | 61003878 A | | 1/1986 | |
| JP | S59-129777 | * | 7/1987 | ............ C23C 11/16 |
| JP | 2000118224 A | | 4/2000 | |
| JP | 2001152315 A | | 6/2001 | |
| JP | 2010189758 A | | 9/2010 | |

OTHER PUBLICATIONS

Extended European Search Report (EESR) dated Jul. 22, 2019 issued in European Application No. 17773782.2.
Japanese Office Action (and English language translation thereof) dated Jun. 18, 2019 issued in counterpart Japanese Application No. 2018-508548.
International Search Report (ISR) dated Mar. 21, 2017 issued in International Application No. PCT/JP2017/005577.
Written Opinion dated Mar. 21, 2017 issued in International Application No. PCT/JP2017/005577.

* cited by examiner

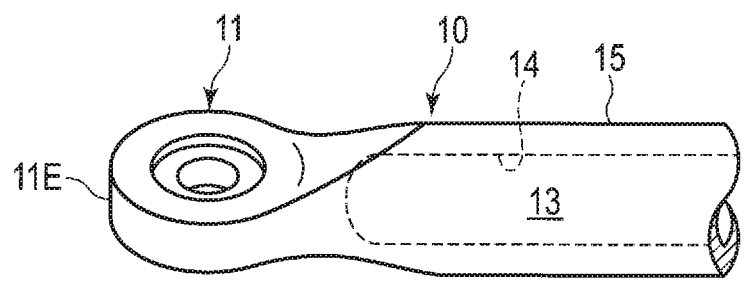
F I G. 2
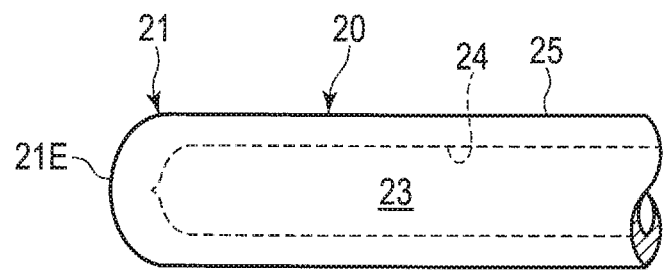
F I G. 3
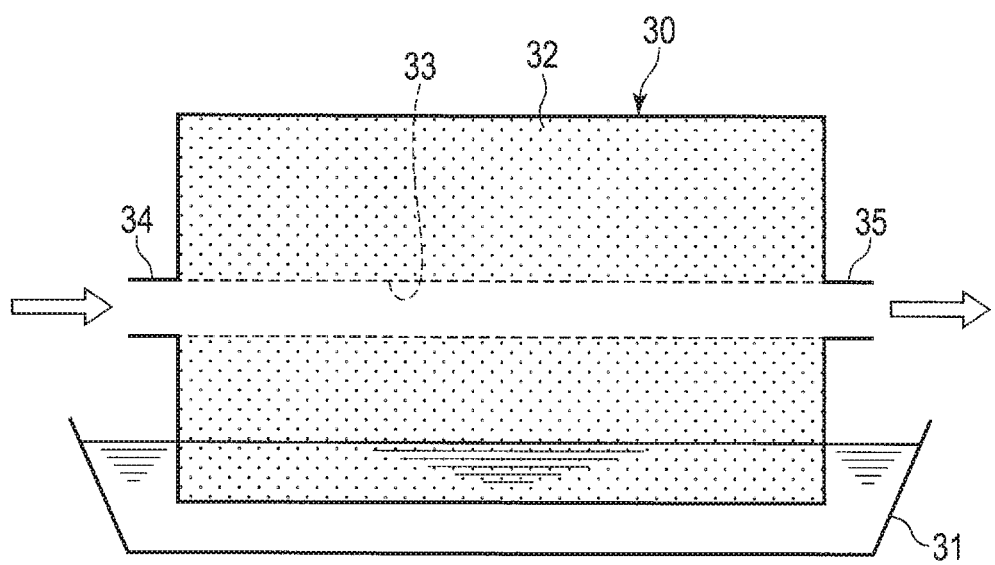
F I G. 4

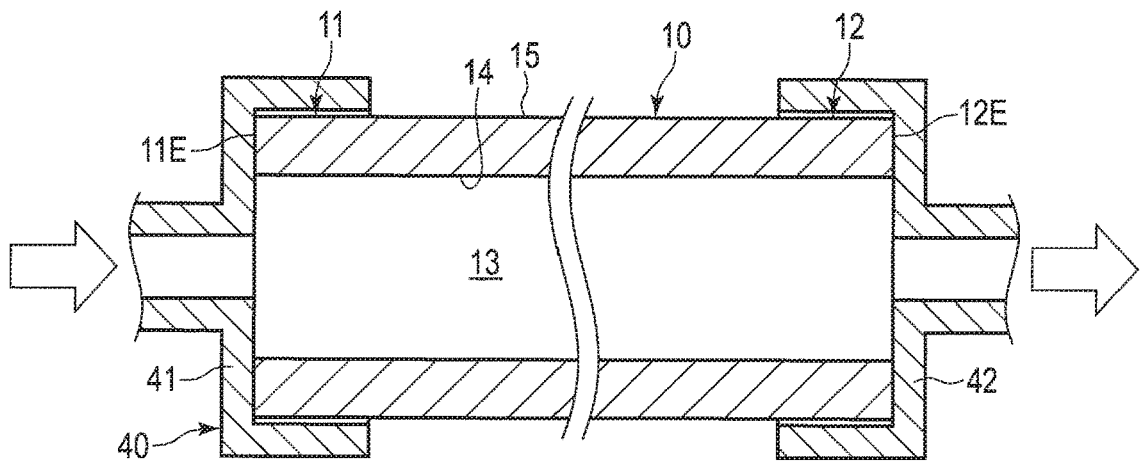
F I G. 5
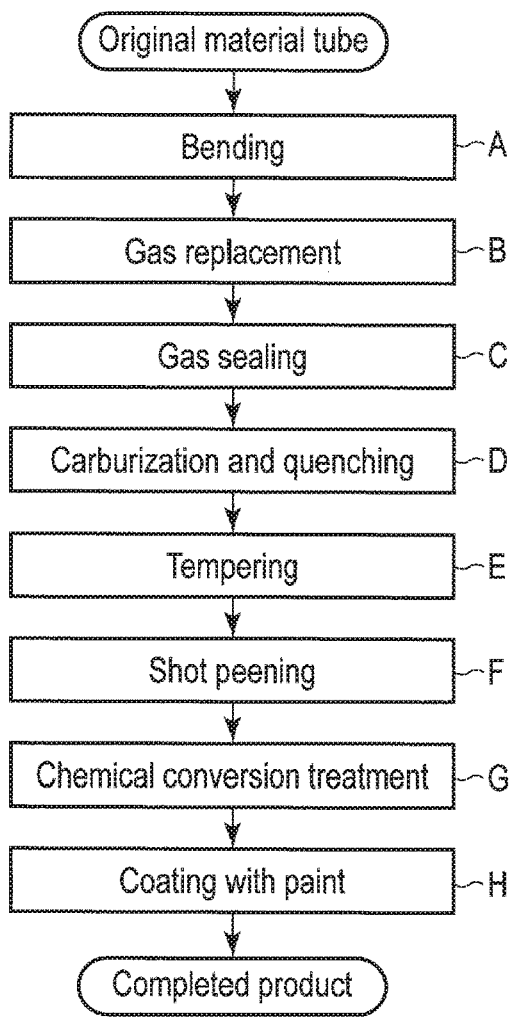
F I G. 6

HOLLOW SPRING MEMBER AND HOLLOW SPRING MEMBER PRODUCTION METHOD

CROSS-REFERENCE TO RELATED APPLICATIONS

This application is a Continuation Application of PCT Application No. PCT/JP2017/005577, filed Feb. 15, 2017 and based upon and claiming the benefit of priority from prior Japanese Patent Application No. 2016-068014, filed Mar. 30, 2016, the entire contents of all of which are incorporated herein by reference.

BACKGROUND OF THE INVENTION

1. Field of the Invention

The present invention relates to a hollow spring member for a vehicle and hollow spring member production method of producing the hollow spring member.

2. Description of the Related Art

A vehicle such an automobile or the like is provided with a suspension device constituted of various suspension members such as a spring member, damper member, and the like, and interposed between a vehicle body and wheel. In the spring member, a coil spring configured to support a load of an axle shaft to thereby absorb a shock, stabilizer configured to make suspension members of right and left, and front and rear wheels operate in cooperation with each other, and the like are included. The stabilizer is, for example, a torsion bar bent into a U-shape.

A hollow spring member (hollow stabilizer, hollow coil spring) the inside of which is made hollow in order to reduce the weight of a vehicle is also known. In order to improve the resistance to fatigue, it is desired that a steel tube outer surface and steel tube inner surface of the hollow spring member be hardened.

As a method of hardening the surface, quenching is widely known. When quenching is carried out at an ideal cooling rate, the degree of hardness of steel is determined by a carbon concentration. However, the surface of the hollow spring member has already been somewhat decarburized at the stage of the original material tube which is a material. When the hollow spring member is subjected to a high temperature for quenching, the decarburization thereof is further advanced. Regarding the steel tube outer surface, residual compression stress can be created by a simple method such as shot-peening treatment or the like, and hence even when the carbon concentration is not perfect, there is no problem. On the other hand, regarding the steel tube inner surface, it is difficult to carry out such treatment. In order to improve the resistance to fatigue, there is the demand for enhancement of the effect of quenching particularly on the steel tube inner surface of a hollow spring member.

In order to enhance the degree of hardness after quenching, it can be considered to carburize the steel tube inner surface before quenching for the purpose of adjusting the carbon concentration (as in Patent Literature 1 (JP 2000-118224 A), for example). However, when a liquid carburizing agent is attached to the steel tube inner surface by immersion or application, the amount of carbon to be carburized is excessive. There is sometimes a case where the carbon concentration is uneven at each position. Occurrence of excessively hardened positions is not desirable for the hollow spring member of which toughness is required as a spring. Further, when the inside of a carburizing furnace is filled with a carburizing gas, and the hollow spring member is put into the inside of the carburizing furnace to thereby be carburized, a dedicated carburization furnace and modification furnace are required, and hence the cost of equipment and administration cost become expensive. Energy consumed by heating the inside of the furnace increases. Putting the hollow spring member into the furnace is carried out in a batch-wise manner, and thus the time required to complete a hollow stabilizer in the production line is prolonged.

BRIEF SUMMARY OF THE INVENTION

An object of an embodiment is to provide a hollow spring member and hollow spring member production method, which can save the time and energy necessary for carburization, thus requiring no dedicated carburizing furnace or the like for carburization, and further can make the interior space of a steel tube a rust-prevention atmosphere.

A hollow spring member according to an embodiment is a hollow stabilizer or a hollow coil spring for a vehicle which includes a steel tube sealed at one end and another end thereof and a carburizing gas sealed in the interior space of the steel tube.

According to another embodiment, a production method of a hollow spring member comprises sealing a carburizing gas in the interior space of a steel tube, thereby to carburize an inner surface of the steel tube for rust-prevention. First, the carburizing gas is fed into one end of the steel tube, and the air in the interior space of the steel tube is expelled from another end on the opposite side of the one end. Then, the one end and the other end are sealed while the interior space of the steel tube is replaced by the carburizing gas, and the steel tube is heated to carburize part of the carburizing gas into the inner surface of the steel tube.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a perspective view showing an example of an end of a hollow stabilizer shown in FIG. 1.

FIG. 3 is a side view showing an example of an end of a hollow coil spring shown in FIG. 1.

FIG. 4 is a cross-sectional view showing an example of an alcoholic vapor generator configured to generate a source gas containing therein an alcoholic vapor.

FIG. 5 is a cross-sectional view showing an example of a gas replacement device configured to replace the interior space of a hollow spring member with a carburizing gas.

FIG. 6 is a view showing an example of a flow of a production process of a hollow stabilizer.

DETAILED DESCRIPTION OF THE INVENTION

Figure 1:
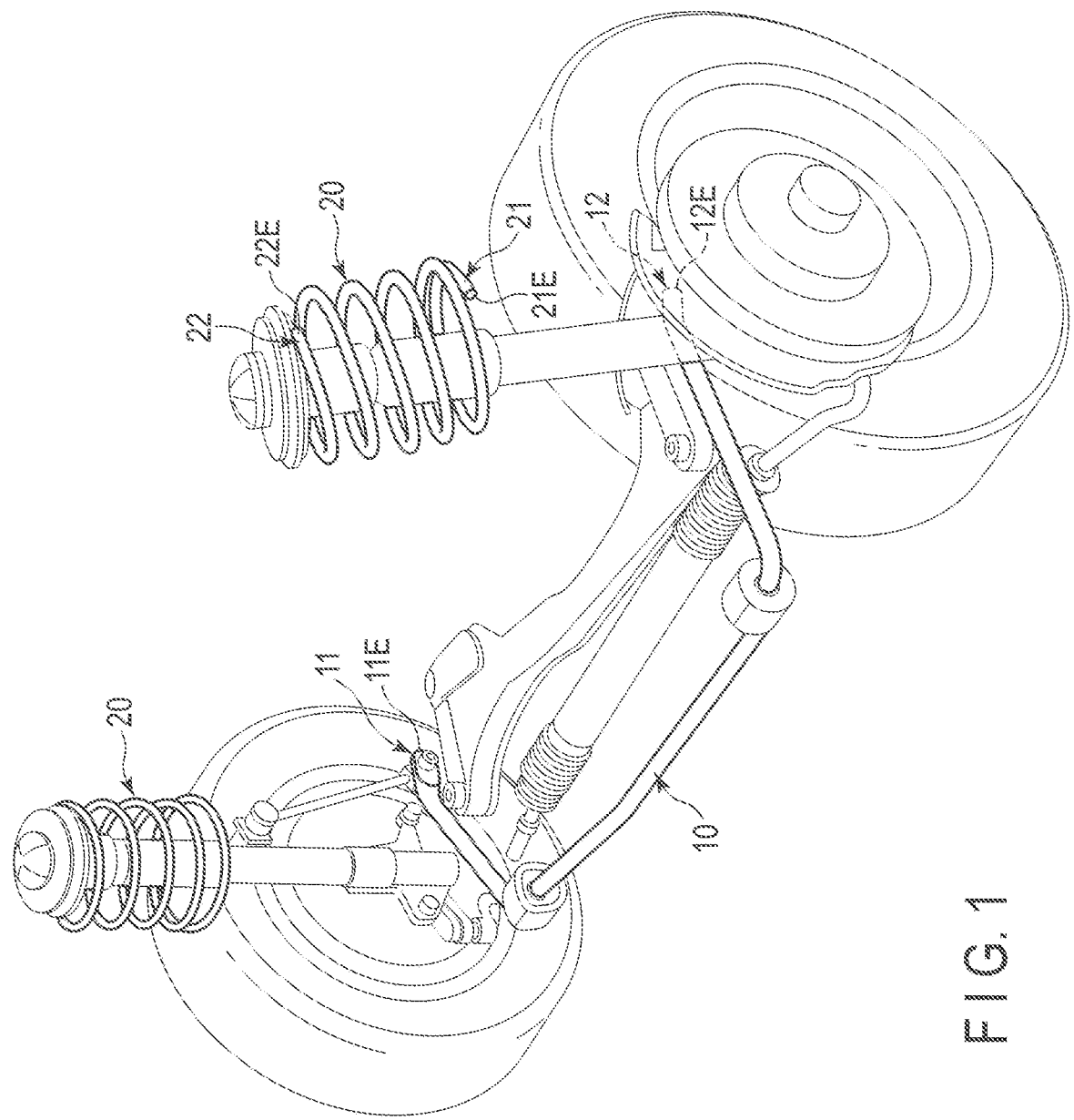
FIG. 1 is a perspective view showing an example of a suspension device to which a hollow spring member according to an embodiment is attached.

One of the embodiments of the present invention will be described hereinafter with reference to the accompanying drawings.

FIG. 1 through FIG. 6 show a hollow spring member according to the present embodiment.

FIG. 1 is a perspective view showing an example of a suspension device 1 to which a hollow spring member is attached. The suspension device 1 is constituted of various suspension members including a hollow stabilizer 10 and hollow coil spring 20.

Each of the hollow stabilizer 10 and hollow coil spring 20 is an example of a hollow spring member of the present invention, and is formed by subjecting a steel tube formed of a spring steel or the like to bending/forming. Although the type of the spring steel constituting the hollow stabilizer 10 and hollow coil spring 20 is not particularly limited, as a steel material for the hollow stabilizer 10, a low-carbon Mn—B steel having a carbon concentration of about 0.15 to 0.40% by mass can be used. For example, SAE10B21 and SAE15B26 conforming to the stipulations of the Society of Automotive Engineers, Inc., can be mentioned. Besides, for examples, 26MnB5 and 34MnB5 can be named.

Further, as an example of a steel material for the hollow coil spring 20, a general steel material for a suspension coil spring can be used. Besides, an Si—Mn steel or Si—Mn—B steel having a carbon concentration of about 0.15 to 0.60 S by mass, UHS1900, UHS1970, ND120S or ND120M can be used.

Alternatively, as other examples of a spring steel material constituting the hollow stabilizer 10 and hollow coil spring 20, SAE9254 conforming to the stipulations of the Society of Automotive Engineers, Inc., and SUP7 conforming to JIS may also be used. Spring steel materials other than the above may also be used. The steel material is not limited to only the spring steel, the type of steel may be a high-strength steel or carburization steel. The hollow stabilizer 10 is constituted of the aforementioned steel tube formed into a U-shape by bending/forming, and includes one end 11E and another end 12E on the opposite side of the one end 11E. The hollow coil spring 20 is constituted of the aforementioned steel tube formed into a helicoid shape by bending/forming, and includes one end 21E and another end 22E on the opposite side of the one end 21E.

FIG. 2 is a perspective view showing an example of an end 11 including the one end 11E of the hollow stabilizer 10. As shown in FIG. 2, a fixing part (eyeball part) configured to attach the hollow stabilizer 10 to a vehicle is formed at the end 11. It should be noted that at an end 12 including another end 12E, a fixing part having a shape approximately identical to the end 11 on the one end 11E side is also formed. The fixing part formed at each of the ends 11 and 12 shuts off the interior space 13 of the hollow stabilizer 10 from the outside. That is, the hollow stabilizer 10 is sealed at the end 11 including the one end 11E and at the end 12 including another end 12E. A carburizing gas to be described later is sealed in the interior space 13 of the hollow stabilizer 10.

FIG. 3 is a side view showing an example of an end 21 including one end 21E of the hollow coil spring 20. It should be noted that an end 22 including another end 22E has a shape approximately identical to the end 21. As shown in FIG. 3, the end 21 is closed in such a manner as to shut off the interior space 23 from the outside. That is, the hollow coil spring 20 is sealed at the end 21 including the one end 21E and at the end 22 including another end 22E as in the case of the hollow stabilizer 10 shown in FIG. 2. A carburizing gas is sealed in the interior space 23 of the hollow coil spring 20.

The carburizing gas is a gas obtained by diluting a source gas containing therein an organic compound with an inert gas such as nitrogen, argon or the like. FIG. 4 is a cross-sectional view showing an example of an alcoholic vapor generator 30 configured to generate a source gas containing therein an alcoholic vapor. It should be noted that the source gas is not limited to a mixed gas containing therein an alcoholic vapor, for example, a high-concentration CO gas supplied from a gas cylinder or the like may also be used. An RX gas obtained by converting a hydrocarbon gas such as a propane gas, butane gas or the like by means of a modification furnace may also be used. Further, the source gas is not limited to a carburizing organic compound in the vapor state. The carburizing organic compound may be in the liquid state or solid state if the carburizing organic compound can be supplied to and sealed in the interior space of the steel tube 10P. Further, the carburizing organic compound contained in the source gas is not limited to one type, and a plurality of carburizing organic compounds may be combined.

An alcoholic vapor generator 30 shown in FIG. 4 is provided with a tray 31 in which a liquid organic compound is accommodated and porous block 32. An example of a liquid organic compound accommodated in the tray 31 is alcohol such as methanol, ethanol or the like. It should be noted that the organic compound in the tray 31 is not limited to alcohol if the organic compound is a liquid at normal temperature. For example, the organic compound may be ketone such as acetone or the like or may be carboxylic acid.

The porous block 32 is constituted of an open-cell cellular porous body, and a flow-through hole 33 penetrating the inside thereof is formed therein. An example of the porous body is a firebrick. At least part of the porous block 32 is immersed in the organic compound of the tray 31.

When an inert gas such as nitrogen, argon or the like heated to a high temperature flows into one end 34 of the flow-through hole 33, alcohol which has permeated/diffused into the inside of the porous block 32 is evaporated, and a source gas containing therein a high-concentration alcoholic vapor flows out of another end 35 of the flow-through hole 33. The source gas obtained by the alcoholic vapor generator 30 is further diluted with an inert gas to thereby be prepared as a carburizing gas of a predetermined carbon potential value. It should be noted that when the predetermined carbon potential value is already obtained before dilution, only the source gas not diluted with the inert gas may be used as the carburizing gas.

FIG. 5 is a cross-sectional view showing a gas replacement device 40 configured to replace the interior space of a hollow spring member with a carburizing gas. It should be noted that although in the example shown in FIG. 5, a hollow stabilizer 10 is subjected to gas replacement as the hollow spring member, the same is true of a case where the hollow spring member is a hollow coil spring 20.

The gas replacement device 40 is provided with a first mounting member (first mouthpiece) 41 and second mounting member (second mouthpiece) 42. The first mounting member 41 has an inner diameter slightly larger than the steel tube 10P constituting the hollow stabilizer, and is fitted on the one end 11E of the steel tube 10P. The first mounting member 41 is connected to the alcoholic vapor generator 30 and inert gas supply source through a flow controller not shown. The second mounting member 42 has a shape approximately identical to the first mounting member 41, and is connected to an external exhaust system.

FIG. 6 is a view showing an example of a flow of a production process of a hollow stabilizer 10.

First, an elongated original material tube formed of a spring steel or the like is subjected to bending/forming, whereby a steel tube 10P having a spring shape (torsion bar) an example of which is shown in FIG. 1 is formed (Step A: bending). Bending is carried out by, for example, cold working. It should be noted that forming may also be carried out by hot working while the original material tube is heated at a temperature higher than the recrystallization temperature.

The interior space 13 of the steel tube 10P is replaced with a carburizing gas (Step B: gas replacement). When the gas replacement device 40 shown in FIG. 5 is used, the carburizing gas is supplied from the first mounting member 41 attached to the one end 11E of the steel tube 10P constituting the hollow stabilizer 10, and the air and surplus carburizing gas are collected from the second mounting member 42 attached to another end 12E. The atmosphere gas of the interior space 13, i.e., the air is replaced with the carburizing gas by gas replacement.

After the interior space 13 is subjected to gas replacement, the ends 11 and 12 are deformed, whereby the carburizing gas is sealed in the interior space 13 (Step C: gas sealing). The opening at each of the one end 11E and another end 12E is narrow as compared with the overall length of the steel tube 10P. Accordingly, while the ends 11 and 12 are processed in order that the ends 11 and 12 may be sealed, most of the carburizing gas is retained in the interior space 13. When the hollow stabilizer 10 is sealed, each of the ends 11 and 12 is subjected to plastic deformation by, for example, upsetting or press working, whereby a fixing part shown in FIG. 2 is formed, and the opening of each of the one end 11E and another end 12E is sealed. When the hollow coil spring 20 is sealed, each of the ends 21 and 22 is subjected to plastic deformation by, for example, spinning or press working as shown in FIG. 3, whereby the opening of each of the one end 21E and another end is sealed.

In the state where the carburizing gas is trapped in the interior space 13, the hollow stabilizer 10 is heated. As the method of heating the hollow stabilizer 10, the hollow stabilizer may be put into a heating furnace or may be subjected to electrification/heating by connection of electrodes. When the carburizing gas comes into contact with the steel tube inner surface 14 of the hollow stabilizer which has been heated to a high temperature, the organic compound such as an alcoholic vapor or the like contained in the carburizing gas is decomposed from the higher grade into the lower grade in sequence. For example, in the case of ethanol, $C_2H_5OH$ is decomposed into $CH_4+CO+H_2$ ($C_2H_5OH \Leftrightarrow CH_4CO+H_2$), and a reducing gas is produced. In the case of methanol, $CH_3OH$ is decomposed into $CO+2H_2$ ($CH_3OH \Leftrightarrow CO+2H_2$), and a reducing gas is produced.

The reducing gas such as CO gas or the like produced by the decomposition of the organic compound solid-solves carbon into the steel tube inner surface 14 by a reaction such as a Boudouard reaction $2CO \Leftrightarrow CO_2$, $CO+H_2 \Leftrightarrow C+H_2O$, $CH_4 \Leftrightarrow C+2H_2$ or the like. Thereby, a carburized layer is formed in at least a surface part of the steel tube inner surface 14.

Although part of the reducing gas produced by the decomposition of the organic compound is used in the Boudouard reaction, the remaining part of the reducing gas exists in the atmosphere of the interior space 13 together with The inert gas such as nitrogen, argon or the like, $CO_2$ gas produced by the Boudouard reaction, and organic compound which is the material.

The hollow stabilizer 10 in which the carburized layer is formed in the steel tube inner surface 14 by heating is rapidly cooled with such a temperature gradient as to create a hardened structure (martensite). That is, in the hollow spring member production method of this embodiment, carburization and quenching are consecutively carried out (Step D: carburization and quenching). The temperature of the hollow stabilizer 10 before the rapid cooling is, for example, 980 to 1000° C. (austenitizing temperature). It is possible to rapidly cool the steel tube 10P by, for example, immersing the steel tube 10P kept at the austenitizing temperature in an oil tank or water tank.

The hollow stabilizer 10 is tempered for adjustment of the degree of hardness (Step E: tempering). A gear wheel, camshaft and the like are normally tempered at a temperature lower than 250° C., in the case of the hollow stabilizer 10, however, in order to secure toughness required of a stabilizer for a vehicle, it is desirable that tempering be carried out at a temperature slightly higher than the temperature required by the condition for a gear wheel, camshaft and the like while avoiding the temperature range of low-temperature tempering brittleness. An example of the tempering temperature according to this embodiment is 150 to 350° C.

The steel tube outer surface 15 of the hollow stabilizer 10 is subjected to shot-peening treatment (Step F: shot peening). By the shot-peening treatment, the steel tube outer surface 15 can be hardened, and the surface stress of the steel tube outer surface 15 can be made uniform. Further, it is possible to impart a residual compression stress to the steel tube outer surface 15, and enhance the durability and resistance to fatigue fracture.

A chemical conversion treatment layer is formed on the steel tube outer surface 15 (Step G: chemical conversion treatment). The chemical conversion treatment layer can be formed by, for example, a phosphoric salt such as a zinc phosphate or the like.

In order to improve the anti-corrosive performance and resistance to chipping, the steel tube outer surface 15 is coated with paint (Step H: coating with paint). The coated film can be formed by, for example, powder baking coating.

After the steps described above, the hollow stabilizer 10 formed by processing the original material tube is completed. It should be noted that when the hollow coil spring 20 is produced from the stage of the original material tube, in aforementioned Step A, in place of bending in which the original material tube is bent/formed into a U-shape, the original material tube is subjected to coiling in which the original material tube is formed into a spiral shape. Coiling is carried out not in the preceding step of the aforementioned gas replacement (Step B) and gas sealing (Step C), but in the post-step of Steps B and C. Other Steps D to H are identical to the production process of the hollow stabilizer 10 described so far. Coiling may be carried out by hot working or may be carried out by cold working. The hollow coil spring production process of this embodiment is provided with, in addition to the steps approximately identical to the general hollow coil spring production process, furthermore, the aforementioned gas replacement (Step B), gas sealing (Step C), and carburization and quenching (Step D).

In the hollow stabilizer 10 and hollow coil spring 20 according to this embodiment configured as described above, a carburizing gas is sealed in the interior space 13 and 23. If heating to be carried out for carburization and heating to be carried out for quenching are separately carried out, energy is consumed each time, with the hollow stabilizer 10 and hollow coil spring 20 according to this embodiment, however, while heating for quenching is carried out, the steel tube inner surfaces 14 and 24 can be carburized. Alternatively, it can also be said that the hollow stabilizer 10 and hollow coil spring 20 in the state where the stabilizer 10 and spring 20 are kept at a high temperature by the heating to be carried out for carburization are rapidly cooled, whereby quenching can be carried out. Thereby, it becomes possible to consecutively carry out carburization and quenching, and energy to be consumed in the production process can be saved.

Furthermore, of the reducing gases such as CO and the like produced by decomposition of the carburizing gas, the remainder which has not been used for formation of the carburized layer is trapped in the interior space 12 or 23, and hence a reducing atmosphere is kept in the interior space 12 or 23. As a result, it is possible to prevent the steel tube inner surfaces 14 and 24 from being rusted for a long period of time.

In the hollow spring member production method of this embodiment, an inert gas containing an alcoholic vapor is used as a source gas of a carburizing gas. Alcohol such as ethanol or the like to be used as the raw material is available at a low price, and hence the cost necessary for carburization can be reduced. The source gas is generated from alcohol which is a liquid at normal temperature, and hence there is a less danger of explosion caused by gas leakage or the like as compared with a case where an RX gas or the like is generated, and the safety of the plant can be improved.

Alcohol or the like to be used as a material can be vaporized by the alcoholic vapor generator 30. The alcoholic vapor generator 30 is simple and compact in configuration as compared with a modification furnace generally used for RX gas conversion, and can be arranged in the close vicinity of the cooling bath or heating device necessary for quenching in layout. Distances between production devices can be made short, and hence the devices can preferably be used for this embodiment in which carburization and quenching are consecutively carried out.

In this embodiment, the interior space 13 or 23 of the hollow stabilizer 10 or hollow coil spring 20 is subjected to gas replacement by the gas replacement device 40. When a dedicated carburizing furnace is used to introduce a carburizing gas into the hollow stabilizer 10 and hollow coil spring 20, cost of the equipment is high and the amount of the carburizing gas to be used is large. Conversely, the gas replacement device 40 is simple in configuration as compared with the carburizing furnace. The cost of the equipment and amount of the carburizing gas to be used can be saved.

In this embodiment, the opening of each of the one end 11E and another end 12E is already sealed (Step C) in the step antecedent to the heating (for example, Step D) of the steel tube 10P. Accordingly, it is possible to shut off the interior space 13 from the outside, and prevent oxygen from flowing into the interior space 13. A gas from the outside is not mixed into the atmosphere of the interior space 13, and hence it is possible to accurately forecast the carbon potential value of the atmosphere of the interior space 13.

Alternatively, as a modification example of this embodiment, when Step B is omitted from the example shown in FIG. 6, and the one end 11E and another end 12E are sealed without gas-replacing the interior space 13 with the carburizing gas, it is possible to make the oxygen contained in the air trapped in the interior space 13 limited. According to the modification example, it is possible to make the carbon which has existed at a position deep inside the steel tube inner surface 14 because of the heating move to the steel tube inner surface 14, and somewhat recover (re-carburize) the carbon concentration of the steel tube inner surface 14.

Furthermore, in this embodiment provided with even Step B for gas replacement, it is possible not only to re-carburize the steel tube inner surface 14 and somewhat recover the carbon concentration, but also to carburize the steel tube inner surface 14 with carbon of the carburizing gas, and enhance the carbon concentration of the steel tube inner surface 14.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hollow spring member for a vehicle comprising:
   a steel tube having a hollow interior space;
   fixing parts which seal openings at both ends of the steel tube to close off the hollow interior space of the steel tube; and
   a carburizing gas sealed in the hollow interior space of the steel tube by the fixing parts in a state before the steel tube is heated such that the steel tube can be heated in a state in which the carburizing gas is sealed in the hollow interior space.

2. The hollow spring member of claim 1, wherein the carburizing gas contains therein an alcoholic vapor.

3. The hollow spring member of claim 1, wherein the carburizing gas carburizes an inner surface of the steel tube and generates a reducing gas in the interior space of the steel tube when the steel tube is heated.

4. A method of producing a hollow spring member for a vehicle, the method comprising:
   introducing a carburizing gas into an interior space of a steel tube having an opening at each of two ends thereof;
   sealing each of the openings at the two ends of the steel tube after the carburizing gas is introduced into the interior space of the steel tube, to thereby seal the carburizing gas in the steel tube; and
   after sealing the carburizing the gas in the steel tube by sealing the two openings at the two ends of the steel tube, heating the steel tube to thereby carburize an inner surface of the steel tube by using part of the carburizing gas.

5. The hollow spring member production method of claim 4, wherein introducing the carburizing gas into the interior space of the steel tube comprises feeding the carburizing gas into one of the ends of the steel tube and expelling air in the interior space of the steel tube from the other of the ends of the steel tube, thereby replacing the air with the carburizing gas in the interior space of the steel tube.

6. The hollow spring member production method of claim 4, further comprising, after heating the steel tube to carburize the inner surface of the steel tube, rapidly cooling the steel tube to quench the steel tube.

7. The hollow spring member of claim 4, wherein the carburizing gas contains therein an alcoholic vapor.

* * * * *